(12) United States Patent
Chieng et al.

(10) Patent No.: US 7,611,635 B2
(45) Date of Patent: Nov. 3, 2009

(54) SYSTEM AND METHOD FOR SEPARATING A FLUID STREAM

(75) Inventors: Jill Hui Chiun Chieng, Amsterdam (NL); Frederick Jan Van Dijk, Amsterdam (NL)

(73) Assignee: Shell Oil Company, Houston, TX (US)

( * ) Notice: Subject to any disclaimer, the term of this patent is extended or adjusted under 35 U.S.C. 154(b) by 27 days.

(21) Appl. No.: 12/158,189

(22) PCT Filed: Dec. 19, 2006

(86) PCT No.: PCT/EP2006/069881

§ 371 (c)(1),
(2), (4) Date: Jun. 19, 2008

(87) PCT Pub. No.: WO2007/071664

PCT Pub. Date: Jun. 28, 2007

(65) Prior Publication Data

US 2008/0272059 A1 Nov. 6, 2008

(30) Foreign Application Priority Data

Dec. 21, 2005 (EP) .................................. 05112603

(51) Int. Cl.
*B01D 17/032* (2006.01)
(52) U.S. Cl. ........................ 210/744; 210/800; 210/537; 210/539; 95/253; 96/157; 96/183; 96/184
(58) Field of Classification Search ................. 210/744, 210/800, 104, 533, 536, 537, 539, 540; 95/253; 96/157, 158, 168, 182, 183, 184
See application file for complete search history.

(56) References Cited

U.S. PATENT DOCUMENTS 1,496,090 A 6/1924 Marker et al.

(Continued)

FOREIGN PATENT DOCUMENTS

DE 10310002 2/2003

(Continued)

*Primary Examiner*—Christopher Upton
(74) *Attorney, Agent, or Firm*—William E. Hickman

(57) ABSTRACT

A system (1) for separating a fluid stream (2) comprising gas, a light liquid and a heavy liquid, the system comprising a separation vessel (5) that is arranged to define a downwardly extending separation space and comprises a downwardly sloping tube (8), the separation space having an inlet (10) for the fluid stream at a first height, an outlet (20) for heavy liquid at a second height below the first height, an outlet (30) for light liquid at a third height between the first and second heights, an outlet (70) for gas above all outlets for liquid, wherein a further outlet (51, 56) for light liquid is provided at a fourth height between the first and third heights, and wherein at least the outlet at the third height is provided with a control valve (33) that is operative to open and close in dependence of the type of liquid in the pipes at that level, and a method of separating a fluid stream comprising gas, a light liquid and a heavy liquid in such a system, wherein an indication of height of an interface between heavy and light liquid in the separation vessel is obtained and the control valve at the third outlet is operated in dependence on the height of the interface.

16 Claims, 3 Drawing Sheets

U.S. PATENT DOCUMENTS

| | | | |
|---|---|---|---|
| 1,516,132 A | 11/1924 | Allen et al. | |
| 1,559,115 A | 10/1925 | Marker et al. | |
| 1,762,538 A | 6/1930 | Worthington | |
| 2,423,793 A | 7/1947 | Olivo et al. | 210/51 |
| 2,825,422 A * | 3/1958 | Schoenfeld | 210/537 |
| 2,984,360 A * | 5/1961 | Smith | 210/537 |
| 3,249,227 A | 5/1966 | Long | 209/211 |
| 3,318,448 A * | 5/1967 | Fryer | 96/184 |
| 3,971,719 A * | 7/1976 | Peters | 210/540 |
| 4,583,998 A * | 4/1986 | Reid et al. | 95/253 |
| 4,661,127 A | 4/1987 | Huntley | 55/174 |
| 5,288,312 A | 2/1994 | Payne et al. | 96/158 |
| 5,507,858 A | 4/1996 | Jepson | 95/262 |
| 6,099,742 A * | 8/2000 | Komistek | 210/539 |
| 6,250,131 B1 | 6/2001 | Pauley et al. | 73/19.05 |
| 6,533,929 B2 * | 3/2003 | Binsfeld et al. | 210/539 |
| 7,278,543 B2 * | 10/2007 | Sagatun et al. | 210/539 |
| 7,540,902 B2 * | 6/2009 | Esparza et al. | 96/182 |
| 2002/0162806 A1 * | 11/2002 | Komistek | 210/539 |

FOREIGN PATENT DOCUMENTS

| | | |
|---|---|---|
| EP | 1044711 | 10/2000 |
| EP | 1352679 | 10/2003 |
| GB | 139417 | 3/1920 |
| GB | 2153251 | 8/1985 |
| GB | 2332632 | 6/1999 |
| WO | WO03080212 | 10/2003 |

\* cited by examiner

SYSTEM AND METHOD FOR SEPARATING A FLUID STREAM

The present application claims priority of European Patent Application No. 05112603.5 filed 21 Dec. 2005.

FIELD OF THE INVENTION

The present invention relates to a system and method for separating a fluid stream comprising gas, a light liquid and a heavy liquid.

BACKGROUND OF THE INVENTION

In the production line from hydrocarbon wells, in particular gas wells, often a multiphase fluid is transported. The fluid typically comprises gas such as natural gas, light liquid such as hydrocarbon oil or condensate, and heavy liquid, such as water (brine). Further the fluid can contain some solids. The flow rate of the produced fluid can vary, as can the phase composition.

Liquids are normally separated from the gas in so-called separator tanks. However, the gas and liquid may have to travel through long pipelines before separation can take place. In that case the liquid can build up in the pipeline to large slugs. Slugs can also result from a so-called pigging operation of the pipeline, in which a pigging device (for example a sphere) is moved through the pipeline, thereby pushing the liquid out. If these slugs are expected to become really large, the separator vessels would become un-practically big. In that case the liquid slug is collected in a slug catcher.

The slug catcher is normally sized so that it is large enough to receive the volume of fluids, in particular liquids, when pigging operations are being performed or have recently been performed.

The slug catcher can in particular be designed to perform a gravity separation or pre-separation of the fluid into gas, light liquid and heavy liquid.

Although generally satisfactory, slug catcher's efficacy in such separation can be compromised when a large surge of fluids is deposited therein. A particular problem arises if due to high water influx, no hydrocarbon stream can be removed from the slug catcher components. This can result in downstream units, such as a three-phase separator, being starved of hydrocarbons which may cause a shut down of the plant and further downstream processing units, e.g. an LNG plant, a Fischer-Tropsch plant or a methanol plant. As the maximum removal rate of water is usually limited, for example depending on the downstream water processing/treating capacity, it may take a long time before the interface level has dropped below the condensate take off point again and condensate removal can be re-continued. In the mean time more liquid may come in which can aggravate the problem, possibly even overfilling the slug catcher.

It is an object of the invention to provide an improved system for separating a fluid stream comprising gas, a light liquid and a heavy liquid which is more robust in handling liquid slugs.

SUMMARY OF THE INVENTION

In accordance with the present invention there is provided a system for separating a fluid stream comprising gas, a light liquid and a heavy liquid, the system comprising a separation vessel that is arranged to define a downwardly extending separation space and comprises a downwardly sloping tube, the separation space having an inlet for the fluid stream at a first height, an outlet for heavy liquid at a second height below the first height, an outlet for light liquid at a third height between the first and second heights, an outlet for gas above all outlets for liquid, wherein a further outlet for light liquid is provided at a fourth height between the first and third heights, and wherein at least the outlet at the third height is provided with a control valve that is operative to open and close in dependence of the type of liquid in the pipes at that level.

Typically slug catchers are designed such that the liquid/gas interface is low during normal operation, so that a large liquid slug can be accommodated when it arrives. Therefore, in a separating slug catcher, the outlets for both heavy and light liquid are normally arranged low as well. However, in the event of a slug the gas/liquid interface as well as the interface between heavy liquid and light liquid raise well above their normal levels. The conventional solution to this problem would be to arrange the outlet for light liquid at a higher position, however this has the disadvantage that the size/volume of the slug catcher increases.

The invention provides a system that allows dynamic control of the height from which light liquid is drawn off, so that a better slug handling performance is achieved without a need to increase the volume.

Suitably, the system further comprises a collector vessel for light liquid having one or more inlets in fluid communication with the outlets for light liquid.

Suitably further, a means for determining the level of an interface in the collector vessel is provided, such as a level meter. The interface is suitably the total liquid level, since during normal operation liquid in the collector vessel will be substantially light liquid only.

Suitably the system comprising a means for determining an indication of height of an interface between light liquid and heavy liquid in the tube. Such a means can be a level meter in the tube, but for example the level meter of the collector vessel can also be used to provide this indication.

In principle, the control valves for controlling the outflux of light liquid can be operated manually on the basis of an indication of the height of the light/heavy interface in the tube. Preferably the system further comprises a controller for controlling the control valve in dependence on a level indication from the level meter.

In a preferred embodiment the system comprises a plurality of downwardly extending tubes. In a particularly advantageous embodiment the collector vessel is formed by one or more of the downwardly extending tubes. These tubes then do not have an inlet for the fluid stream, e.g. fluid communication through an existing inlet opening for the fluid stream is blocked.

Suitably a plurality of outlets for light liquid is provided at different heights, e.g. a total of 2-5 such outlet openings. In a special embodiment the highest outlet for light liquid is arranged above a highest expected heavy liquid level and is not provided with a liquid control valve. This outlet is therefore always in open communication with the collector vessel.

In the event that the system comprises a plurality of downwardly extending tubes, there is suitably further provided one or more transverse fluid connectors between the downwardly extending tubes, at a height between the first and second heights, preferably at least one above the third height. Such so-called sub-headers promote the equilibration of liquid and interface levels throughout the plurality of tubes. The movement of liquid in the slug catcher will be stabilized and separation between heavy and light liquid is expected to improve.

Suitably, an outlet for light liquid is arranged in fluid communication with such a transverse fluid connector.

The invention further provides a method of separating a fluid stream comprising gas, a light liquid and a heavy liquid, the method comprising providing a downwardly extending separation vessel having an inlet for fluid at a first height, an outlet for heavy liquid at a second height below the first height, an outlet for light liquid at a third height between the first and second heights, an outlet for gas above all outlets for liquid, and a further outlet for light liquid at a fourth height between the first and third heights, wherein at least the outlet at the third height is provided with a control valve;

admitting the fluid stream to the inlet for fluid;

withdrawing heavy liquid from the outlet for heavy liquid;

withdrawing light liquid from at least one of the outlets for light liquid;

withdrawing gas from the outlet for gas;

obtaining an indication of height of an interface between heavy and light liquid in the separation vessel operating the control valve at the third outlet in dependence on the height of the interface.

Suitably there is provided a collector vessel for light liquid having one or more inlets in fluid communication with the outlets for light liquid, and wherein the indication of height of the interface between heavy and light liquid is based on an indication of height of an interface in the collector vessel.

BRIEF DESCRIPTION OF THE DRAWINGS

The invention will now be described in more detail and with reference to the accompanying drawings, wherein.

Where the same reference numerals are used in different Figures, they refer to the same or similar objects.

DETAILED DESCRIPTION OF THE INVENTION

For the ease of reference, in the detailed description reference will be made to condensate and water instead of light and heavy liquid, respectively, but it shall be clear that the same principles apply for other compositions of light and heavy liquid.

Figure 1:
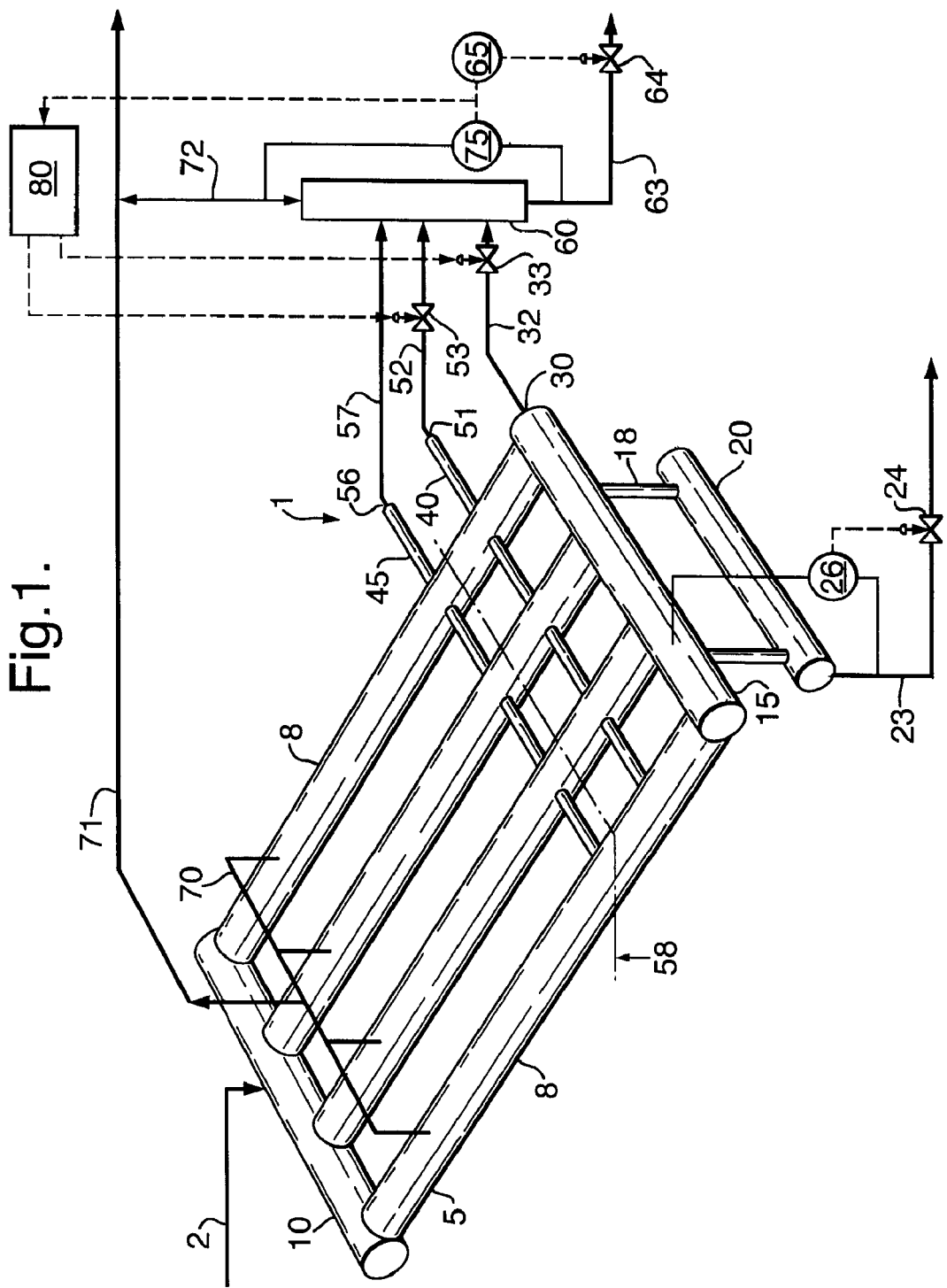
FIG. 1 shows schematically a perspective view of a first embodiment of the invention.

Reference is made to FIG. 1 showing schematically a system 1 for separating a fluid stream 2 comprising gas, a light liquid and a heavy liquid. The system includes a separating slug catcher 5 which represents a separation vessel and defines a downwardly extending separation space. The slug catcher as shown comprises four tubes 8 that slope downwardly from an inlet for the fluid stream 2 at a first height, inlet header 10. Four tubes are shown but it will be clear that more or less tubes can be arranged. In principle one tube can be sufficient. A typical number of tubes, also referred to as bottles, is 2-10, preferably 4-8, for example 6. The tubes typically slope at a small angle, typically less or even far less than 10 degrees with the horizontal for optimum separation. The tubes extend to a condensate header 15 at a third height, which is connected via downwardly extending conduits 18 to water header 20 of the slug catcher 5 at a second height.

The water header is connected to an outlet conduit 23 for water from the slug catcher 5 including a valve 24. A level meter 26 is suitably installed to determine the height of the condensate/water interface in the area of condensate header 15 and water header 20, for example using a measurement of a pressure difference. The valve 24 can be controlled to maintain the height above a predetermined minimum, and as far as possible below a predetermined maximum.

The condensate header has an outlet 30 for condensate at the third height, connected to an outlet conduit 32 equipped with a controllable valve 33.

Two further condensate sub-headers transversely connecting the tubes 8 at different heights are provided between the inlet header 10 and the condensate header 15, i.e. first condensate sub-header 40 at a fourth height above the third height and second condensate sub-header 45 at a fifth height above the fourth height. An outlet 51 from first condensate sub-header 40 at the fourth height is connected to outlet conduit 52 that is controllable by valve 53. An outlet 56 from second condensate sub-header 45 at the fourth height is connected to outlet conduit 57.

The separation vessel has no inlet for a fluid stream to be received during normal operation that is located below any outlet for liquid.

The system moreover comprises a collector vessel 60 for condensate. The collector vessel has an inlet in fluid communication with an the outlet 30 from the condensate header 15 via controllable conduit 32, an inlet in fluid communication with an the outlet 51 from the first condensate sub-header 40 via controllable conduit 52, and an inlet in fluid communication with an the outlet 56 from the second condensate sub-header 45 via conduit 57. Further, the collector vessel is connected to an outlet conduit 63 for condensate at is lower end, which outlet conduit is equipped with a valve 64 controlled by controller 65.

Each tube 8 of the slug catcher 5 is provided with an outlet for gas above all outlets for condensate, i.e. above the second condensate sub-header 45 at the fifth height. The gas outlet conduits and gas header 70 are schematically indicated and are connected to gas outlet conduit 71. The transverse gas header 70 is preferably arranged higher than the inlet header 10. The upper end of collector vessel 60 is also connected to the gas outlet conduit via conduit 72, to provide an outlet for gas from the vessel. This is also beneficial for good pressure communication between different parts of the system 1, so that in particular the liquid levels in the collector vessel 60 are substantially the same as in the bottles 8.

The separation space defined by the slug catcher 5 is formed by the interior of the tubes 8, inlet header 10, condensate header and sub-headers 15, 40, 45, water header 20 and conduits 18. The by far largest volume share thereof is represented by the tubes 8.

Liquid in the collector vessel 60 will substantially only be condensate, so that a total liquid level measurement in the vessel 60 gives a good indication of the level of the condensate/gas interface in the tubes 8. A level meter level meter 75 is thus provided to monitor the total liquid level in the collector vessel, and can also be based on a pressure difference measurement, or can e.g. be floating meter. The meter represents a means for determining an indication of height of an interface between light liquid and heavy liquid in the system. Another means could be one or more level meters in the tubes 8, but this is regarded less efficient.

The level meter has an output line to controller 80 controlling at least valves 33 and 53. In this embodiment an output from the level meter goes also to controller 65 controlling the withdrawal of condensate from the vessel, suitably in level control. Controllers 65 and 80 could also be integrated into one device for a plurality of control purposes.

During normal operation of the system 1 a fluid stream 2 comprising gas, condensate and water is received in the inlet header 10 and distributed over the tubes. In the tubes gravity separation takes place, with water at the bottom, in the water header 20, condensate on top, typically filling at least the upper part of condensate header 15, and gas in the upper part of the tubes.

Water is removed from the water header 20 via conduit 23 under level control by valve 24. Gas is removed via conduit 71, typically under pressure control (not shown) wherein a pressure in line 71 is measured and coupled back to a controller/valve upstream in the feed line 2, such as to a production platform. Conduit 71 will also typically include an overpressure safety valve (not shown).

Further during normal operation, condensate will be present in at least the upper part of the condensate header 15, where the outlet 30 is arranged. The valve 33 will normally be open.

When a slug arrives, the water/condensate interface and the condensate/gas interface in the tubes 8 will rise. In particular, the water/condensate interface can rise above the outlet 30 of the condensate header 15 (third height). However, water is to be prevented from entering the collection vessel 60. The valve 33 is therefore closed in the event of a slug. If the water condensate level has not yet reached the fourth height of the outlet 51 from first condensate sub-header 40, valve 53 remains open and provides an outlet for condensate into the collection vessel. If the water/condensate level rises above the outlet 51, valve 53 is also closed, but condensate can continue to flow to the collection vessel via outlet 56 and conduit 57. The second condensate sub-header 45 is arranged at a height above a maximum possible height 58 of the water/condensate interface in the slug catcher 5. This maximum can be determined during design of the system. For this reason, conduit 57 does not need to be provided with a controllable valve like conduits 32 and 52. It shall be clear, however, that a controllable valve can also be provided in conduit 57.

Controlling of the valves 33, 53, can in principle be done on the basis of any indication of the height of the water/condensate level. Even the indication of a slug arriving from upstream in line 2 could be used to close the valves, or a direct measurement of the water/condensate interface. Preferably the total level of liquid (condensate) in the collector vessel 60 is used. To this end the output from level meter 75 is fed to controller, and the controller is arranged to only open valve 33, or 53, if the liquid level in collector vessel 60 is below a predetermined maximum level for each valve. The predetermined maximum level for the condensate/gas interface for opening of a valve in the collector vessel is selected such that the associated water/condensate interface in the slug catcher 5 is below the height of the outlet from the respective condensate (sub)-header. Suitably, the predetermined maximum level is selected to be a predetermined height above the height of the respective outlet from the condensate (sub-)header.

So, if a slug arrives and the condensate level in the collector vessel 60 will rise and the valves 33, and 53 if needed, will be closed. When the slug is over, the condensate level in the collector vessel 60 and the water/condensate interface in the slug catcher 5 will decrease again, and the valves can be opened again to resume normal operation.

The collector vessel 60 can is also be provided with a separate and independent functioning minimum level safeguarding protection, independent of the level control system (not shown). In this way equipment downstream of conduit 63, e.g. a further separator for the condensate, can be safely protected of gas blow-by, which can be seen as a risk with multiple draw-off points for condensate at different heights.

Figure 2:
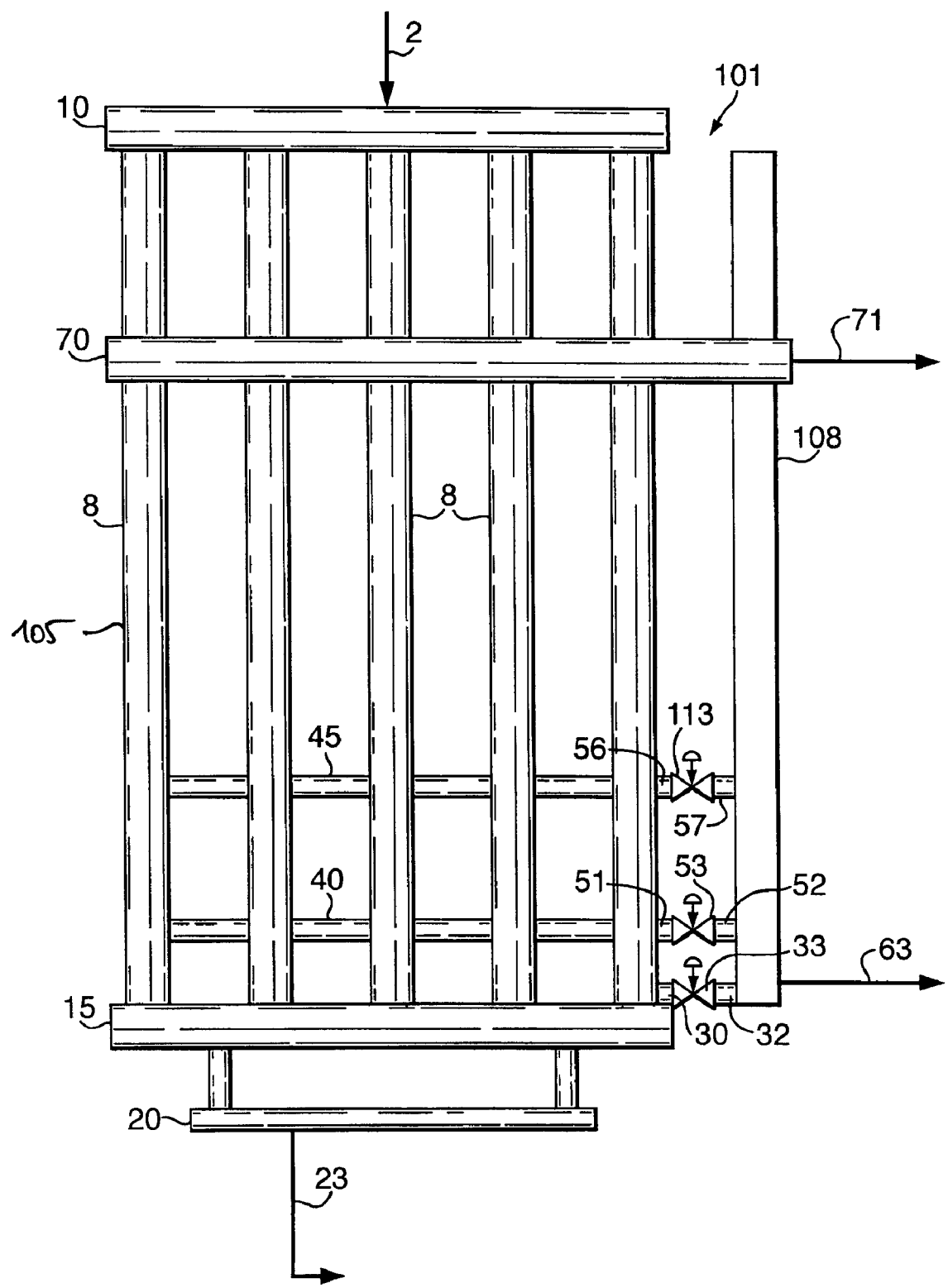
FIG. 2 shows schematically a top view of a second embodiment of the invention.

Reference is made to FIG. 2, showing a second embodiment of a system 101 of the invention. FIG. 2 is a top view onto a slug catcher 105 generally similar to the slug catcher 5 of FIG. 1, and the same reference numerals have been used to designate the same or similar parts. The main difference is that one of the tubes, tube 108, is arranged to function as collector vessel, so that no separate collector vessel (like 60 in FIG. 1) needs to be installed. The collector tube 108 is not connected to the inlet header 10. Alternatively, e.g. when adapting an existing slug catcher according to the present invention, fluid communication with the inlet header can be blocked. The collector tube 108 is connected to the gas header 70, and via conduits 32,52,57 equipped with controllable valves 33,53,113 to the condensate header 15, first and second condensate sub-headers 40,45, respectively.

The control circuit of system 101 is not shown in FIG. 2 for the sake of clarity, and it shall be clear that it can be arranged analogous to the one discussed with reference to FIG. 1. In particular, a suitable liquid level meter for the condensate level in the inclined tube 108 can be arranged for the collector tube 108 to provide input for a controller for the valves 33,53, 113. Water outflux through conduit 23 is suitably controlled in dependence on the level of the water/condensate interface. Condensate outflux through conduit 63 is suitably controlled in dependence on the liquid level in collector tube 108, also maintaining a minimum condensate level in that tube. Gas is withdrawn from conduit 71 suitably under pressure control. With such a control system, normal operation if the system 101 can be analogous to that discussed for system 1 above. It is an advantage of the system 101 that the dedicated collector tube 108 is part of the volume of the slug-catcher and does not represent extra volume that needs to be installed. This is because the liquid slug will also fill up this tube, be it from below.

Figure 3:
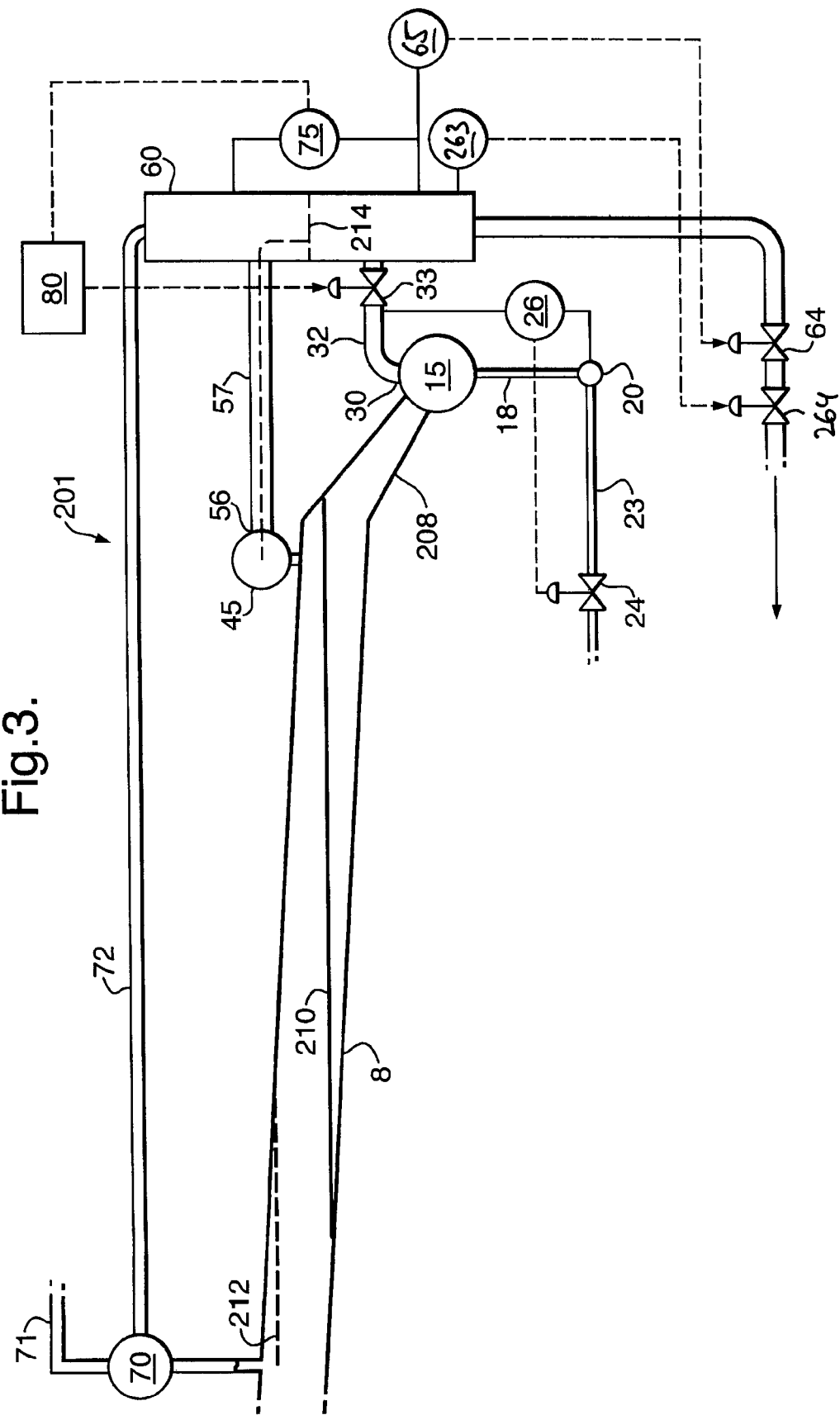
FIG. 3 shows schematically a side view of a third embodiment of the invention.

Reference is made to FIG. 3. The Figure shows a third embodiment of a system 201 of the present invention system in side view. The system 201 is generally similar to the one discussed with reference to FIG. 1, and like reference numerals are used for the same or similar parts.

In side view it is shown that the tubes 8 slope downwardly at a very small angle. Typical is an angle with the horizontal of 0.5-1 degrees. The downstream part 208 can have a larger slope as shown, e.g. 1-5 degrees. The angles are exaggerated in FIG. 3. The inlet header is not shown. Tubes can have a diameter of 1-2 meter, and the total volume of a slug-catcher can be 1000-3000 m$^3$.

Only one condensate sub-header 45 is arranged, above a predetermined maximum water level so that no control valve for conduit 57 is provided. The control circuit is largely similar to that of FIG. 1, here a separate low level controller 263 for the collector vessel 60, controlling valve 264, is shown, for separate minimum level safeguarding protection.

The condensate sub-header 45 is here arranged above the tubes 8, instead of between the tubes as in FIG. 1. It could also be arranged below that tubes, but that can be problematic in the event that the feed contains a significant amount of solids which could settle in such a subheader.

The Figure shows the system 201 in a situation that a slug arrives. The water/condensate interface 210 is located well above the condensate header 15. The condensate/gas 212 interface therefore also rises quickly and fills the collector vessel. The liquid level 214 in the collector vessel has already risen to above the level at which the controller 80 caused the valve 33 to close. Alternatively or in addition, also the information from the level meter of the water/condensate interface 26 can be used to control the valve 33.

Depending on the quality of the condensate-water separation being realised in the slug catcher, the condensate and water as drawn from the system of the invention can be routed directly to downstream liquid processing, or first via one or more dedicated separators such as three-phase separators for better separation.

The invention can with advantage be used for receiving a fluid from gas fields, in particular offshore gas fields, wherein the hydrocarbon gas often also contains associated liquids such as hydrocarbon oil and/or water.

Gaseous hydrocarbons may include impurities, such as hydrogen sulphide, nitrogen, carbon dioxide or other gases. The water may also contain impurities, such as mercury, scale, and additives such as hydrate additives including glycol and anti-corrosion additives, dissolved salt such as sodium, calcium and magnesium chlorides.

Any solids present may comprise iron sulphate, scale, other carbonates, sand, and small quantities of barium sulphate or strontium sulphate. The solids may also comprise pyrophoric compounds. If required, solids filters can be arranged in the lines 23 and/or 63.

Preferably substantially all of the undissolved gas will be separated in the slug catcher from the liquid.

'Substantially' as used herein, unless otherwise stated, typically means at least 90% of a total stream, preferably at least 95% of a total stream and may mean 100% of a total stream.

The system of the present invention can operate at high pressures of e.g. between 40-120 bar, preferably 60-90 bar. Downstream equipment such as further separators can operate at a pressure less than that of the slug catcher, such as at a pressure of between 20-40 bar.

Preferably a plurality of feed pipelines, such as two or three pipelines, are connected to the inlet end of the system. Preferably only one pipeline is cleaned using pipeline pigs at any one time.

Separated hydrocarbon gas may be used to prepare synthesis gas, that is a mixture of carbon monoxide and hydrogen by partial oxidation.

The Fischer Tropsch process can be used for the conversion of the synthesis gas into liquid and/or solid hydrocarbons. The synthesis gas is fed into a reactor where it is converted in one or more steps over a suitable catalyst at elevated temperature and pressure into paraffinic compounds ranging from methane or $C_5+$ to high molecular weight modules comprising up to 200 carbon atoms, or, under particular circumstances, even more.

The gas could of course also be also be used for other purposes, e.g. domestic supply or converting into liquefied natural gas That which is claimed is:

1. A system for separating a fluid stream comprising gas, a light liquid and a heavy liquid, the system comprising a separation vessel that is arranged to define a downwardly extending separation space in part formed by the interior of a downwardly sloping tube, the separation space having an inlet for the fluid stream at a first height, an outlet for heavy liquid at a second height below the first height, a outlet for light liquid at a third height between the first and second heights, an outlet for gas above all outlets for liquid,
    wherein a further outlet for light liquid is provided at a fourth height between the first and third heights, and wherein at least the outlet at the third height is provided with a control valve that is operative to open and close in dependence of the type of liquid in the tube at that height.

2. The system according to claim 1, wherein the system further comprises a collector vessel for light liquid having one or more inlets in fluid communication with the outlets for light liquid.

3. The system according to claim 2, further comprising a level meter for determining the level of an interface in the collector vessel.

4. The system according to claim 3, further comprising a controller for controlling the control valve in dependence on a level indication from the level meter.

5. The system according to claim 2, wherein the system comprises a plurality of downwardly extending tubes, some of which tubes form part of the separation vessel, and wherein the collector vessel is formed by one or more of the remaining tubes, which tubes do not have an inlet for the fluid stream.

6. The system according to claim 1, further comprising a means for determining an indication of height of an interface between light liquid and heavy liquid in the system.

7. The system according to claim 1, comprising a plurality of outlets for light liquid at different heights, wherein the highest outlet for light liquid is arranged above a highest expected heavy liquid level and is not provided with a liquid control valve.

8. The system according to claim 1, wherein the separation vessel comprises a plurality of downwardly extending tubes, and further comprises one or more transverse fluid connectors between the downwardly extending tubes, at a height between the first and second heights.

9. The system according to claim 1, wherein the separation vessel has no inlet for a fluid stream to be received during normal operation that is located below any liquid outlet.

10. The system according to claim 1, wherein the separation vessel is provided in the form of a separating slug catcher.

11. The system according to claim 1, wherein the tube slopes downwardly from the inlet for the fluid stream at the first height, and wherein the tube is provided with the outlet for gas.

12. The system according to claim 1, wherein the control valve is operative to be closed when heavy liquid is in the tube at the third height.

13. The system according to claim 1, wherein the control valve is operative to be opened only when light liquid is in the tube at the third height.

14. A method of separating a fluid stream comprising gas, a light liquid and a heavy liquid, the method comprising
    providing a downwardly extending separation vessel having an inlet for fluid at a first height, an outlet for heavy liquid at a second height below the first height, an outlet for light liquid at a third height between the first and second heights, an outlet for gas above all liquid outlets, and a further outlet for light liquid at a fourth height between the first and third heights, wherein at least the outlet at the third height is provided with a control valve;
    admitting the fluid stream to the inlet for fluid;
    withdrawing heavy liquid from the heavy liquid outlet;
    withdrawing light liquid from at least one of the outlets for light liquid, comprising withdrawing light liquid from the outlet at the third height when the control valve is open;
    withdrawing gas from the outlet for gas;
    obtaining an indication of height of an interface between heavy and light liquid in the separation vessel;
    operating the control valve at the third outlet in dependence on the height of the interface.

15. The method according to claim 14, wherein there is provided a collector vessel for light liquid having one or more inlets in fluid communication with the outlets for light liquid, and wherein the indication of height of the interface between heavy and light liquid is based on an indication of height of an interface in the collector vessel.

16. The method according to claim 14, wherein said withdrawing light liquid from at least one of the outlets for light liquid comprises withdrawing light liquid from the outlet at the third height when the control valve is open.

* * * * *